US008653182B2

(12) United States Patent
Tanaka et al.

(10) Patent No.: US 8,653,182 B2
(45) Date of Patent: Feb. 18, 2014

(54) INK JET RECORDING MEDIUM, COATING SOLUTION FOR FORMING INK RECEIVING LAYER, AND METHOD FOR PRODUCING INK JET RECORDING MEDIUM

(75) Inventors: Shinichi Tanaka, Osaka (JP); Hiroyuki Ono, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 215 days.

(21) Appl. No.: 13/141,404

(22) PCT Filed: Dec. 24, 2009

(86) PCT No.: PCT/JP2009/071437

§ 371 (c)(1), (2), (4) Date: Jun. 22, 2011

(87) PCT Pub. No.: WO2010/074146

PCT Pub. Date: Jul. 1, 2010

(65) Prior Publication Data

US 2012/0116008 A1 May 10, 2012

(30) Foreign Application Priority Data

Dec. 24, 2008 (JP) ................................ 2008-327598

(51) Int. Cl.
*C08L 29/04* (2006.01)

(52) U.S. Cl.
USPC ......................... 524/557; 427/385.5; 427/391

(58) Field of Classification Search
USPC ................................ 427/385.5, 391; 524/557
See application file for complete search history.

(56) References Cited

U.S. PATENT DOCUMENTS

2004/0265514 A1 12/2004 Sakaguchi et al.
2008/0299318 A1 12/2008 Sakaguchi et al.
2009/0253865 A1 10/2009 Shibutani et al.

FOREIGN PATENT DOCUMENTS

| | | | |
|---|---|---|---|
| EP | 1 930 352 | 6/2008 | |
| JE | 58-8199 | 1/1983 | |
| JP | 58-008199 | 1/1983 | |
| JP | 05-185758 | 7/1993 | |
| JP | 5-185758 | 7/1993 | |
| JP | 2001-213045 | 8/2001 | |
| JP | 2005-145043 | 6/2005 | |
| JP | 2005-194666 | * 7/2005 | ................ D01F 6/14 |
| WO | 2009/028646 | 3/2009 | |

OTHER PUBLICATIONS

International Search report for International Application No. PCT/JP2009/071437, mail date is Feb. 23, 2010.
Extended European Search Report issued with respect to corresponding European Patent Application No. 09834944.2, dated May 25, 2012.
Japanese Office Action issued with respect to counterpart Japanese Application No. 2008-327598, dated Mar. 22, 2013, with English Translation thereof.
Concise explanation of relevance of JP 58-008199 Mar. 22, 2013.

* cited by examiner

*Primary Examiner* — James J Seidleck
*Assistant Examiner* — Marie Reddick
(74) *Attorney, Agent, or Firm* — Greenblum & Bernstein, P.L.C.

(57) ABSTRACT

The present invention provides an ink jet recording medium having an ink receiving layer excellent in the coloration resistance and water resistance; and a coating solution for forming an ink receiving layer, which exhibits a large difference in the gelation rate between at ambient temperature and under heating, and is stable at ambient temperature and swiftly gelled when heated. The present invention relates to an ink jet recording medium comprising an ink receiving layer containing an acetoacetic ester group-containing polyvinyl alcohol resin crosslinked by a glyoxylate on a supporting base; and a coating solution for forming an ink receiving layer containing an acetoacetic ester group-containing polymer compound, a glyoxylate and water.

10 Claims, 2 Drawing Sheets

Fig. 1
Fig. 2
Solution by Chemistry
http://www.nichigo.co.jp/
Solution by Chemistry
http://www.nichigo.co.jp/

*Fig. 3*
Solution by Chemistry
http://www.nichigo.co.jp/

(a)

(b)

INK JET RECORDING MEDIUM, COATING SOLUTION FOR FORMING INK RECEIVING LAYER, AND METHOD FOR PRODUCING INK JET RECORDING MEDIUM

TECHNICAL FIELD

The present invention relates to an ink jet recording medium having an ink receiving layer on a supporting base. More specifically, the present invention relates to an ink jet recording medium which is excellent in water resistance and coloration resistance of an ink receiving layer.

The present invention also relates to a coating solution for forming an ink receiving layer, which is suitable for the method for forming an ink receiving layer in which the coating solution applied on a supporting base is gelled and then dried, and a method for producing an ink jet recording medium which uses the coating solution.

BACKGROUND ART

The ink jet recording system is a system of recording a letter, an image or the like by jetting an ink droplet from a nozzle to fly, land in and be fixed on a surface of a recording medium, and this system is widely used as a printer in homes, offices and the like because of its many advantages such as easiness of full color printing, low running cost, small power consumption and less noise during printing.

Also, with the spread of an ink jet printer, an ink jet special paper is used for the printing, and a wide variety of papers from a gloss-type suitable for printing of a photographic image to a matted-type suitable for printing of a document are put on the market.

The ink receiving layer of such an ink jet special paper is roughly classified into a microporous-type in which a micropore formed by an inorganic fine particle absorbs the ink, and a swelling-type in which a polymer absorbs the ink and swells, and in recent years, a microporous-type excellent in the ink absorptivity (absorption amount, absorption rate) is predominating.

The ink receiving layer in such a microporous-type ink jet recording medium is mainly composed of an inorganic fine particle and its binder resin, and as the binder resin, a polyvinyl alcohol resin (hereinafter, polyvinyl alcohol is simply referred to as PVA) excellent in the affinity for a water-based ink broadly used for ink jet recording as well as in the binder force for inorganic fine particles is principally used.

The ink receiving layer containing such a PVA resin as the binder for inorganic fine particles is usually formed by applying an aqueous coating solution containing a PVA resin, an inorganic particle and other components on a supporting base and drying the coating by heating to remove water.

However, the ink receiving layer in an ink jet recording medium is relatively thick and takes a long time to dry and therefore, in the drying process, a wind ripple pattern is readily produced by the effect of an airflow in a drier to reduce the glossiness, the layer thickness tends to become non-uniform, or cracking sometimes occurs due to non-uniformity in the drying rate.

In order to prevent such surface defects of the ink receiving layer, there has been developed a method where a crosslinking agent having a capability of crosslinking the PVA resin is used in combination and the coating layer is once gelled to eliminate the fluidity and then dried.

For example, a method of applying a coating solution containing a PVA resin and boric acids on a supporting base, cooling and thereby gelling the coating layer, and then drying the gel by heating is widely known.

However, gelling of the PVA resin by boric acids requires cooling of the system, and this makes it difficult to enhance the productivity or reduce the production cost.

To solve these problems, a method where a modified PVA resin having a keto group is used as a crosslinkable system allowing for progress of gelling at ambient temperature or under heating, and a compound having two or more hydrazide groups within the molecule is used as a crosslinking agent; and an ink jet recording medium produced by such a method, which has high gloss and is excellent in ink absorptivity and water resistance and free from a problem such as fold-cracking, have been proposed (see, for example, Patent Document 1).

RELATED ART

Patent Document

Patent Document 1: JP-A-2005-145043

SUMMARY OF THE INVENTION

Problems that the Invention is to Solve

However, the present inventors investigated the ink jet recording medium described in Patent Document 1 and revealed that the ink receiving layer tends to be colored with time depending on the storage environment or use environment. Also, it was revealed that such an ink receiving layer has room for more improvement in view of water resistance under harsh conditions.

In addition, the coating solution for forming an ink receiving layer using the crosslinkable system described in Patent Document 1 allows for only a short pot life after mixing due to its high gelation rate at ambient temperature and needs to be mixed immediately before application on a supporting base and swiftly applied and therefore, the PVA resin and the crosslinking agent may not be uniformly mixed, giving rise to non-uniform characteristics. Accordingly, in the method for forming an ink receiving layer, where the coating layer is gelled and then dried, it is preferred to use a combination of a PVA resin allowing for slow progress of gelling at ambient temperature but swiftly undergoing gelling when heated, and a crosslinking agent.

That is, an object of the present invention is to provide an ink jet recording medium having an ink receiving layer excellent in the coloration resistance and water resistance.

Another object of the present invention is to provide a coating solution for forming an ink receiving layer, which exhibits a large difference in the gelation rate between at ambient temperature and under heating and is stable at ambient temperature but swiftly gelled when heated.

Means for Solving the Problems

Under these circumstances, the present inventors have made intensive studies, and as a result found that the first object of the present invention is attained by an ink jet recording medium comprising an ink receiving layer containing an acetoacetic ester group-containing polyvinyl alcohol resin (hereinafter simply referred to as "AA-PVA-based resin") crosslinked by glyoxylates on a supporting base, and the present invention has been accomplished based on this finding.

It has been also found that the second object of the present invention is attained by a coating solution for forming an ink receiving layer, containing an AA-PVA-based resin, a glyoxylate and water, and the present invention has been accomplished based on this finding.

The gist of the present invention is described below, but the present invention is not limited to the following contents.

(1) An ink jet recording medium comprising a supporting base and an ink receiving layer containing an acetoacetic ester group-containing polyvinyl alcohol resin crosslinked by a glyoxylate.

(2) A coating solution for forming an ink receiving layer of an ink jet recording medium, containing an acetoacetic ester group-containing polyvinyl alcohol resin, a glyoxylate and water.

(3) The coating solution for forming an ink receiving layer described in (2), wherein the glyoxylate is an alkali metal salt of glyoxylic acid, or an alkaline earth metal salt of glyoxylic acid.

(4) The coating solution for forming an ink receiving layer described in (3), wherein the glyoxylate is sodium glyoxylate or calcium diglyoxylates.

(5) The coating solution for forming an ink receiving layer described in any one of (2) to (4), wherein the content of the acetoacetic ester group in the acetoacetic ester group-containing polyvinyl alcohol resin is from 0.1 to 20 mol %.

(6) The coating solution for forming an ink receiving layer described in any one of (2) to (5), wherein the content of the glyoxylate is from 0.1 to 200 parts by weight per 100 parts by weight of the acetoacetic ester group-containing polyvinyl alcohol resin.

(7) The coating solution for forming an ink receiving layer described in any one of (2) to (6), which further contains an inorganic fine particle.

(8) The coating solution for forming an ink receiving layer described in any one of (2) to (7), wherein the pH is from 3 to 10.

(9) The coating solution for forming an ink receiving layer described in any one of (2) to (8), wherein the solid content concentration is from 1 to 50% by weight.

(10) A method for producing an ink jet recording medium, comprising, in this order, a step of applying the coating solution for forming an ink receiving layer described in any one of (2) to (9) on a supporting base, a step of heat-treating the coating to cause gelling, and a step of drying the gelled coating to form an ink receiving layer.

In the present invention, the glyoxylate functions as a crosslinking agent for the AA-PVA-based resin, and the crosslinked structure, that is, the structure obtained by a reaction of the AA group and the glyoxylate, is presumed to be a structure shown below. In this connection, the following formula shows a representative example in the case of a monovalent metal such as alkali metal, and in the formulae below, X represents a monovalent metal such as alkali metal. In the case of a multivalent metal such as alkaline earth metal, other crosslinked structures may be formed, or the metal is shared with a free glyoxylic acid.

[Chem. 1]

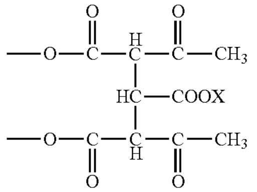

That is, the characteristic features of the ink jet recoding medium of the present invention are obtained due to the fact that the crosslinked structure is held very firm against water and a structural change or the like involving coloration does not occur.

Also, the coating solution for forming an ink receiving layer of the present invention takes advantage of the property that the rate of crosslinking reaction between the AA-PVA-based resin and the glyoxylate is sensitive to the temperature change.

Effects of the Invention

The ink jet recording medium of the present invention is characterized by little coloration with time during storage and excellent water resistance.

Also, the coating solution for forming an ink receiving layer of the ink jet recording medium of the present invention is stable at a low temperature near ambient temperature but undergoes high-speed gelling at a high temperature and exhibits a large ratio of change in the gelation rate with respect to the temperature, so that the pot life of the coating solution can be long and the uniformity of the coating solution can be enhanced during the pot life. Furthermore, due to rapid gelling in a series of steps leading to drying under heating, it is easy to shorten the steps.

Accordingly, the coating solution is very suitable for the method for producing an ink jet recoding medium, where a coating solution for forming an ink receiving layer is coated on a supporting base, gelled and then dried.

MODE FOR CARRYING OUT THE INVENTION

Figure 1:
FIG. 1 shows the printed matter after the ink jet recording medium obtained in Example 1 is evaluated for water resistance.

The constituent elements described below are an example (a representative example) of the embodiments of the present invention, and the present invention is not limited to these contents.

The ink jet recording medium of the present invention comprises an ink receiving layer containing an AA-PVA-based resin crosslinked by a glyoxylate on a supporting base, and the ink receiving layer can be obtained by applying a coating solution for forming an ink receiving layer containing an AA-PVA-based resin, a glyoxylate and water, on a supporting base, and drying the coating.

These are described in sequence below.

[AA-PVA-Based Resin]

The AA-PVA-based resin for use in the present invention is described below.

The AA-PVA-based resin for use in the present invention is a PVA resin having an acetoacetic ester group in the side chain.

The production method of such an AA-PVA-based resin is not particularly limited, but examples thereof include a method of reacting a PVA resin and a diketene, a method of reacting a PVA resin and an acetoacetic ester to effect transesterification, and a method of saponifying a copolymer of vinyl acetate and vinyl acetoacetate. The resin is preferably produced by the method of reacting a PVA resin and a diketene, because the production process is simple and a good-quality AA-PVA-based resin is obtained. This method is described below.

A saponification product of a polymer of a vinyl ester monomer or a derivative thereof is generally used as the PVA resin working out to a raw material. Examples of the vinyl ester monomer include vinylformate, vinylacetate, vinylpropionate, vinylvalerate, vinylbutyrate, vinylisobutyrate, vinylpivalate, vinylcaprate, vinyllaurate, vinylstearate, vinylbenzoate, and vinylversatate. From the economical viewpoint, vinylacetate is preferably used.

Also, a saponification product of a copolymer of a vinyl ester monomer and a monomer copolymerizable therewith and the like can also be used. Examples of the copolymerization monomer include olefins such as ethylene, propylene, isobutylene, α-octene, α-dodecene and α-octadecene; hydroxy group-containing α-olefins such as 3-buten-1-ol, 4-penten-1-ol, 5-hexen-1-ol and 3,4-dihydroxy-1-butene, and derivatives thereof, such as acylation product; unsaturated acids such as acrylic acid, methacrylic acid, crotonic acid, maleic acid, maleic anhydride, itaconic acid and undecylenic acid, and salts, monoesters or dialkyl esters thereof; nitriles such as acrylonitrile and methacrylonitrile; amides such as diacetoneacrylamide, acrylamide and methacrylamide; olefinsulfonic acids such as ethylenesulfonic acid, allylsulfonic acid and methallylsulfonic acid, and salts thereof; vinyl compounds such as alkylvinyl ethers, dimethylallylvinylketone, N-vinylpyrrolidone, vinyl chloride, vinylethylene carbonate, 2,2-dialkyl-4-vinyl-1,3-dioxolane and glycerinmonoallyl ether; substituted vinyl acetates such as isopropenyl acetate and 1-methoxyvinyl acetate; vinylidene chloride, 1,4-diacetoxy-2-butene, 1,4-dihydroxy-2-butene, and vinylene carbonate.

Other examples include polyoxyalkylene group-containing monomers such as polyoxyethylene(meth)allyl ether, polyoxyethylene(meth)acrylamide, polyoxypropylene (meth)acrylamide, polyoxyethylene(meth)acrylate, polyoxypropylene(meth)acrylate, polyoxyethylene(1-(meth)acrylamide-1,1-dimethylpropyl)ester, polyoxyethylenevinyl ether, polyoxypropylenevinyl ether, polyoxyethyleneallylamine, polyoxypropyleneallylamine, polyoxyethylenevinylamine, and polyoxypropylenevinylamine; and cationic group-containing monomers such as N-acrylamidomethyltrimethylammonium chloride, N-acrylamidoethyltrimethylammonium chloride, N-acrylamidopropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride and diethyldiallylammonium chloride.

In this regard, the amount of the copolymerization monomer introduced varies depending on the kind of the monomer and cannot be indiscriminately specified, but usually, the amount introduced is preferably 10 mol % or less, more preferably 5 mol % or less, based on all structural units. If the amount introduced is too large, water solubility may deteriorate or compatibility with the crosslinking agent is sometimes decreased and thus this is not preferred.

Furthermore, a resin in which a 1,2-diol bond as a heterogeneous bond is introduced into the PVA main chain in a ratio of approximately from 1.6 to 3.5 mol % by controlling the polymerization temperature to 100° C. or more at the polymerization or copolymerization of the vinyl ester monomer and the other monomer, may be used.

For the introduction of an acetoacetic ester group by the reaction of a diketene with a PVA resin obtained by saponifying a polymer and copolymer of the vinyl ester monomer, a PVA resin and a gaseous or liquid diketene may be directly reacted or, for example, a method of previously adsorbing and storing an organic acid in the PVA resin and then spraying and reacting the gaseous or liquid diketene in an inert gas atmosphere, or a method of spraying a mixture of an organic acid and the liquid diketene on the PVA resin and allowing their reaction to proceed, is employed.

As the reaction device used when implementing the reaction above, a device capable of heating and equipped with a stirring blade is used. Examples of the device which can be used include a kneader, a Henschel mixer, a ribbon blender, other various blenders, and a stirring/drying device.

The average degree of polymerization of the thus-obtained AA-PVA-based resin may be suitably selected according to its usage but usually, is preferably from 300 to 4,000, more preferably from 500 to 3,500, still more preferably from 1,000 to 3,000, yet still more preferably from 1,500 to 2,500. If the average degree of polymerization is too small, there is a tendency that a sufficient water resistance or a sufficient crosslinking rate is not obtained, whereas if it is excessively large, the viscosity becomes too high in use as an aqueous solution and this tends to make it difficult to apply the aqueous solution to various steps, for example, coating on a base becomes difficult.

Usually, the degree of saponification of the AA-PVA-based resin for use in the present invention is preferably 80 mol % or more, more preferably 85 mol % or more, still more preferably 90 mol % or more, yet still more preferably 95 mol % or more. If the degree of saponification is low, there is a tendency that an aqueous solution is difficult to form, stability of the aqueous solution decreases, or water resistance of the crosslinked polymer obtained becomes insufficient. Incidentally, the average degree of polymerization and the degree of saponification depend on the PVA resin used as a raw material and are measured in accordance with JIS K6726.

Usually, the content of the acetoacetic ester group (hereinafter simply referred to as "degree of AA") in the AA-PVA-based resin is preferably from 0.1 to 20 mol %, more preferably from 0.3 to 15 mol %, still more preferably from 0.5 to 10 mol %, yet still more preferably from 1 to 5 mol %. If this content is too small, there is a tendency that a insufficient water resistance results or a sufficiently high gelation rate is not obtained, whereas if it is excessively large, this tends to decrease the water solubility or reduce the stability of the aqueous solution.

In the present invention, as the AA-PVA-based resin, a resin having a hydroxyl group average chain length of 10 or more is usually used, and a resin having a chain length of 15 or more is preferably used. If the hydroxyl group chain length is too short, this tends to decrease the water resistance of the crosslinking reaction product obtained.

The hydroxyl group average chain length and the measuring method thereof are described in detail in "Poval" (issued by *Kobunshi Kanko Kai*, page 248, 1981) and Macromolecules, Vol. 10, page 532 (1977), the contents of which are incorporated herein by way of reference.

In the present invention, all PVA resins are preferably an AA-PVA-based resin, but a PVA resin other than an AA-PVA-based resin may be used in combination. The content thereof is usually 20% by weight or less, preferably 10% by weight or less.

Examples of various PVA resins other than an AA-PVA-based resin include an unmodified PVA resin and modified PVA resins using various monomers recited above as a raw material of the AA-PVA-based resin.

In the AA-PVA-based resin for use in the present invention, there may partially remain an alkali metal acetate (mainly derived from, for example, a reaction product with acetic acid produced by saponification of an alkali metal hydroxide used as the saponification catalyst and a polyvinyl acetate) such as sodium acetate, an organic acid (derived from, for example, an organic acid stored in PVA at the reaction with a diketene when introducing an acetoacetic acid ester group into the PVA resin) such as acetic acid, and an organic solvent (derived from, for example, a reaction solvent for the PVA resin or a washing solvent at the production of the AA-PVA-based resin) such as methanol and methyl acetate, which are used or by-produced in the production process.

[Glyoxylate]

The glyoxylate used as the crosslinking agent for the AA-PVA-based resin in the present invention is described below.

Examples of the glyoxylate include an alkali metal salt of glyoxylic acid, an alkaline earth metal salt of glyoxylic acid, and an amine salt of glyoxylic acid; and alkali metal and alkaline earth metal salts of glyoxylic acid are preferably used. Examples of the alkali metal include sodium and potassium, and representative examples of the alkaline earth metal include magnesium and calcium.

Particularly, in the present invention, when hydrophilicity of the carboxylate group introduced into the crosslinked structure is low as compared with the carboxylic acid group, this is considered to contribute to enhancing the water resistance of the ink receiving layer containing a crosslinked polymer, and a glyoxylate having a smaller solubility in water, that is, having low affinity for water, is preferred. Specifically, the solubility in water at 23° C. is preferably from 0.01 to 100%, more preferably from 0.1 to 50%, still more preferably 0.5 to 20%. Specific examples of the glyoxylate having a low solubility in water include sodium glyoxylate (solubility: about 17%) and calcium diglyoxylates (solubility: about 0.7%).

As for the production method of the glyoxylate, a known method may be used, but examples thereof include (1) a method by a neutralization reaction of a glyoxylic acid, (2) a method by a salt-exchange reaction of a glyoxylic acid with a salt of an acid having an acid dissociation constant larger than that of a glyoxylic acid, and (3) a method by alkaline hydrolysis of a glyoxylic acid ester (see, for example, JP-A-2003-300926). Above all, the method of (1) is preferably used when the water solubility of an alkaline compound used for the neutralization reaction with a glyoxylic acid is high, and the method of (2) is preferably used when the water solubility of the obtained glyoxylate is low and the water solubility of the salt of an acid having an acid dissociation constant larger than that of a glyoxylic acid is high.

In this regard, the method of (1) is usually performed using water as a medium, and the glyoxylate can be produced by reacting a glyoxylic acid with an alkaline compound such as alkali metal hydroxide or alkaline earth metal hydroxide in water, separating the precipitated glyoxylate by filtration, and drying it.

The method of (2) is also generally performed in water, and the glyoxylate can be obtained in the same manner as in the method of (1). In this regard, examples of the salt of an acid having an acid dissociation constant larger than that of a glyoxylic acid, used in the method of (2), include alkali metal or alkaline earth metal salts of an aliphatic carboxylic acid, such as sodium acetate, calcium acetate and calcium propionate.

The glyoxylate has a possibility of containing raw materials used in the production thereof, impurities contained in raw materials, by-products, and the like. For example, a glyoxylic acid, an alkali metal hydroxide, an alkaline earth metal hydroxide, an aliphatic carboxylate of an alkali metal, an aliphatic carboxylate of an alkaline earth metal, glyoxal, an oxalic acid, or an oxalate is contained in some cases.

In particular, when a glyoxylic acid is used as a raw material, the glyoxylate has a possibility of containing glyoxal that is a by-product at the production of the glyoxylate, and although the content of glyoxal is most preferably 0% by weight, the content is preferably 5% by weight or less, more preferably 2% by weight or less, still more preferably 1% by weight or less. If the content of glyoxal is large, the coating solution for forming an ink receiving layer obtained by mixing the glyoxylate with the AA-PVA-based resin is reduced in the stability and allowed to have only a short pot life or the ink receiving layer containing the resulting crosslinked polymer of the AA-PVA-based resin may be colored with time depending on the storage conditions.

In the present invention, the glyoxylate includes compounds where its aldehyde group is acetalized or hemiacetalized, for example, with an alcohol having a carbon number of 3 or less, such as methanol and ethanol, or a diol having a carbon number of 3 or less, such as ethylene glycol and propylene glycol. The acetal group or hemiacetal group easily eliminates its alcohol in water or at a high temperature and is equilibrated with the aldehyde group and therefore, reacts with various monomers or functional groups similarly to the aldehyde group, and the compound functions as a crosslinking agent.

Usually, the amount of the glyoxylate used for forming the ink receiving layer of the present invention is preferably from 0.1 to 200 parts by weight, more preferably from 0.5 to 50 parts by weight, still more preferably from 1 to 20 parts by weight, yet still more preferably from 3 to 10 parts by weight, per 100 parts by weight of the AA-PVA-based resin.

If the amount of the glyoxylate used is too small, the water resistance of the ink receiving layer is liable to become insufficient, whereas if it is excessively large, the ink absorptivity tends to be inhibited.

[Other Crosslinking Agents]

The present invention is characterized by using a glyoxylate as the crosslinking agent for the AA-PVA-based resin, but known crosslinking agents for the AA-PVA-based resin may be also used in combination within the range not impairing the operational effects of the present invention. Examples of the crosslinking agent which can be used in combination include a multivalent metal compound such as titanium compound, zirconium compound and aluminum compound; a boron compound such as boric acid and borax; an amine compound; a hydrazine compound such as dihydrazide adipate and hydrazide polyacrylate; a silane compound; a methylol compound such as methylolated melamine and methylolated urea; an aldehyde compound such as glyoxal, glyoxylic acid and their derivatives, e.g., hemiacetal form and acetal form; an epoxy compound; a thiol compound; an isocyanate compound; and an epoxy resin.

[Other Binder Resins]

The binder resin for use in the ink receiving layer of the ink jet recording medium of the present invention is mainly composed of the above-described AA-PVA-based resin crosslinked by the glyoxylate, but other binder resins may be also used in combination within the range not impairing the purposes of the present invention or the characteristic features required of the ink jet recording medium.

Such a binder resin is required to be hydrophilic similarly to the PVA resin, and the resin is used in an aqueous system at the production in many cases and therefore, is preferably water-soluble or water-dispersible resin.

Specific examples thereof include starch derivatives such as starch, starch oxide and cation-modified starch; natural proteins such as gelatin and casein; cellulose derivatives such as methyl cellulose, ethyl cellulose, hydroxyethyl cellulose and CMC; natural polymeric saccharides such as sodium alginate and pectin; water-soluble resins such as polyvinylpyrrolidone and poly(meth)acrylate; an SBR latex, an NBR latex, a vinyl acetate resin-based emulsion, an ethylene-vinyl acetate copolymer emulsion, a (meth)acrylic ester resin-based emulsion, a vinyl chloride resin-based emulsion, and a urethane resin-based emulsion.

In the case of using such another binder resin in combination, usually, the blending amount thereof is preferably 20% by weight or less, more preferably 10% by weight or less, based on the entire binder resin. If the blending amount is too large, the purposes of the present invention may not be sufficiently achieved.

[Inorganic Fine Particle]

In a preferred embodiment, the ink receiving layer of the ink jet recording medium of the present invention contains an inorganic fine particle, similarly to a normal microporous-type ink jet recording medium.

As the inorganic fine particle, a known inorganic fine particle may be used according to the required function, and examples thereof include calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, magnesium silicate, calcium silicate, amorphous silica, vapor phase silica, colloidal silica, alumina, alumina sol, aluminum hydroxide, zeolite, magnesium hydroxide, zirconium oxide, zirconium hydroxide and cerium oxide. Incidentally, two or more kinds of these fine particles may be also used in combination.

Particularly, in the case of a matted-type ink jet recording medium, amorphous silica is preferably used. Above all, amorphous silica having an average particle diameter of 1 to 20 μm is generally used, and the particle diameter is preferably from 3 to 10 μm. If the particle diameter is too large, the micropore becomes large and coarse, and this tends to make it difficult to obtain a clear image.

In the case of a gloss-type ink jet recording medium, colloidal silica, vapor phase silica, wet silica, alumina or the like is preferably used. The particle diameter thereof is usually, in terms of the average particle diameter, preferably from 3 to 500 nm, more preferably from 3 to 200 nm, still more preferably from 10 to 50 nm. If the average particle diameter is too small, the micropore formed by the inorganic fine particle becomes excessively small and the ink absorptivity during printing is reduced, giving rise to feathering or the like in some cases, whereas if it is too large, this tends to impair the smoothness of the ink receiving layer or decrease the glossiness.

The content of the inorganic fine particle is preferably from 100 to 3,000 parts by weight, more preferably from 200 to 2,000 parts by weight, still more preferably from 300 to 1,500 parts by weight, per 100 parts by weight of the AA-PVA-based resin. If the content of the inorganic fine particle is too large, reduction in the glossiness may be incurred or the surface strength of the ink receiving layer may be reduced to cause cracking or dust falling. On the contrary, if the content of the inorganic fine particle is excessively small, the micropore volume in the ink receiving layer becomes small and the ink absorptivity is reduced, giving rise to feathering or the like in some cases.

[Additives]

The ink receiving layer of the ink jet recording medium of the present invention may contain various additives usually used in the ink receiving layer, in addition to the above-described binder resin and inorganic fine particle.

Examples of the additives include a cationic compound used as the fixing agent of an anionic ink generally employed for ink jet recording; a dispersant for the inorganic fine particle, a thickener, a fluidity improver, a surfactant, a defoaming agent, a release agent and a penetrant, which are additives effective at the production; and a dye, a pigment, a fluorescent brightener, an ultraviolet absorber, an antioxidant, an antiseptic and a fungicide, which are additives used for enhancing the characteristics of the product or imparting functionality.

The cationic compound includes a water-soluble metal compound and a cationic resin. Examples of the water-soluble metal include a metal salt such as calcium salt, barium salt, manganese salt, copper salt, cobalt salt, nickel salt, iron salt, magnesium salt and aluminum salt. Examples of the cationic resin include, but are not limited to, polyalkylene polyamines such as polyethylene polyamine and polypropylene polyamine, or derivatives thereof, acrylic polymers having a secondary amino group, a tertiary amino group or a quaternary ammonium salt, a polyvinylamine copolymer, a polyvinylamidine copolymer, a dicyandiamide-formalin copolymer, a dimethylamine-epichlorohydrin copolymer, an acrylamide-diallylamine copolymer, and a diallyldimethylammonium chloride copolymer. A plurality of these resins may be used in combination.

The technique disclosed in JP-A-2001-213045, where in an ink jet recording medium having a coating layer containing an AA-PVA-based resin, the coloration resistance is improved by incorporating a reducing agent into the coating layer, can be also applied to the present invention, and the contents of this publication are incorporated herein by way of reference.

[Supporting Base]

The supporting base for use in the ink jet recording medium of the present invention is described below.

The ink jet recording medium of the present invention is an ink jet recording medium where an ink receiving layer containing an AA-PVA-based resin crosslinked by a glyoxylate is formed on a supporting base.

Examples of the supporting base include, as a water-resistant supporting base, a film, a sheet, a synthetic paper, which are composed of a thermoplastic resin such as polyethylene, polypropylene, polyethylene terephthalate, polyethylene naphthalate, polyvinyl chloride and acrylic resin, a resin-coated paper having a surface coated with the thermoplastic resin above, and a metal foil; and include, as a water-absorbing supporting base, general printing paper such as high-quality paper, medium-quality paper and gravure paper, newsprint paper, release paper, glassine paper, manila board, white board, cloth and nonwoven fabric. A plastic plate, a disc and the like, which are mainly composed of, for example, a polycarbonate resin, a polyester resin or a polyvinyl chloride resin may be also used.

Particularly, in the case of using a thin film-like base such as film, synthetic paper, resin-coated paper and paper, a base having a thickness of 50 to 250 μm is preferably used.

Incidentally, when a supporting base having a thermoplastic resin surface is used, for the purpose of enhancing its adhesive property, the base is preferably subjected to, for example, a corona discharge treatment, a flame treatment, a plasma treatment or an ultraviolet irradiation treatment, before applying the coating solution for forming an ink receiving layer. For the same purpose, a primer layer may be also provided between the supporting base and the ink receiving layer.

On the side opposite the surface where the ink receiving layer is provided, various backcoat layers are preferably provided so as to enhance, for example, writing property, antistatic property, conveying property or curl-preventing property.

[Coating Solution for Forming Ink Receiving Layer]

The AA-PVA-based resin, the glyoxylate, the inorganic fine particle, which are described in detail above, and additives which are blended if desired, are dissolved in water and dispersed, whereby the coating solution for forming an ink receiving layer of the present invention is obtained. For the preparation of this coating solution, a method of previously dissolving or dispersing each material in water and then mixing the solutions or dispersions, or a method of preparing an aqueous solution of an AA-PVA-based resin in advance, sequentially blending other materials therewith, and mixing, dissolving or dispersing the materials, may be employed.

Particularly, in the case of blending the inorganic fine particle, a mixing device suitable for uniformly dispersing the inorganic powder in a liquid, such as high-speed homogenizer, is preferably used.

The total solid content in the coating solution of the ink receiving layer is usually from 1 to 50% by weight, preferably from 5 to 40% by weight, more preferably from 10 to 30% by weight, based on the entire composition. In this regard, the amount of water in the coating solution of the ink receiving layer is usually from 50 to 99% by weight, preferably from 60 to 95% by weight, more preferably from 70 to 90% by weight, based on the entire composition. If the total solid content is too large, the viscosity of the coating solution becomes high and this tends to make the coating difficult or readily cause production of a coating mottle, whereas if it is too small, the ink receiving layer becomes to have a small thickness and exhibits insufficient ink absorptivity, bringing a tendency that the printing density lowers or the surface strength is impaired, or the coating must be performed a plurality of times, which is liable to raise the production cost.

The coating solution for forming an ink receiving layer of the present invention is characterized by being stable at a low temperatures near ambient temperature but undergoing high-speed gelling at a high temperature and exhibiting a large ratio of change in the gelation rate with respect to the temperature change. Therefore, a long pot life of the coating solution is allowed and the uniformity of respective components in the coating solution can be enhanced during the pot life. Furthermore, the coating solution is suitable for the method to form an ink receiving layer, where the coating solution applied on a supporting base is gelled and then dried.

The ratio of change in the gelation rate with respect to the temperature change can be also controlled by the pH of the coating solution, and the pH is usually from 3 to 10, preferably from 4 to 9, more preferably from 5 to 7. If this pH is too high, the coloration resistance tends to decrease, whereas if it is too low, this sometimes brings a possibility of corroding the coating machine or causes coloration of the printed image.

The pH of the coating solution can be adjusted by appropriately adding an alkali metal hydroxide such as sodium hydroxide, an amine compound such as ammonia, an inorganic acid of various types, such as hydrochloric acid and sulfuric acid, or an organic acid such as acetic acid, citric acid, tartaric acid and ascorbic acid.

The thus-prepared coating solution for forming an ink receiving layer of the present invention is excellent in the stability at ambient temperature and therefore, has a long pot life. This coating solution is excellent also from the economical viewpoint, because even when produced in a large amount at a time and left over without being used up, the coating solution can be stored.

[Ink Jet Recording Medium]

The ink jet recording medium of the present invention is described below.

The ink jet recording medium of the present invention comprises an ink receiving layer containing an AA-PVA-based resin crosslinked by a glyoxylate on a supporting base, and the production method thereof is a method where an aqueous coating solution for forming an ink receiving layer containing an AA-PVA-based resin, a glyoxylate and, if desired, other additives such as inorganic fine particle is applied on a supporting base and then dried.

In particular, the coating solution for forming an ink receiving layer for use in the present invention is suitable for the method of applying the coating solution on a supporting base, heating it to cause gelling and then drying the gel, and an ink jet recording medium with more excellent glossiness can be obtained by this method.

As the method for applying the coating solution for forming an ink receiving layer on a supporting base, a known coating method can be used, and examples thereof include a bar coating method, a roll coating method, an air knife coating method, a blade coating method, a curtain coating method, a slide bead method and an extrusion method.

The coating amount is usually adjusted to give a dry thickness of preferably from 3 to 100 μm, more preferably from 5 to 80 still more preferably from 10 to 50 μm. if this thickness is too large, cracking is readily produced in the ink receiving layer or the weight of the product uneconomically increases, whereas if it is too small, the ink absorptivity tends to be lacking.

As the method for heating the coating solution applied on a support, a method of passing the support through a high-temperature air, a method of contacting the support with a heated roll, infrared heating, microwave heating, or the like may be employed.

The drying temperature is usually from 30 to 150° C., preferably from 50 to 120° C.

The ink jet recording medium of the present invention is preferably produced by the method where the coating solution for forming an ink receiving layer is applied on a supporting base, once gelled by heating and then dried. In the case of employing such a method, as the conditions when gelling the coating solution, the heating is performed at a temperature of usually from 30 to 120° C., preferably from 40 to 100° C., for preferably from 1 to 1,200 seconds, more preferably from 5 to 600 seconds. Thereafter, it is further heated and dried at a temperature of preferably from 30 to 150° C., more preferably from 50 to 120° C.

Incidentally, it is also a preferred embodiment that the coating solution in the stage of being gelled is put into pressure-contact with a cast drum having a gloss surface so as to further impart surface smoothness and glossiness.

EXAMPLES

The present invention is described below by referring to Examples, but the present invention is not limited to the description of Examples as long as its purport is observed.

In Examples, unless otherwise indicated, the "parts" and "%" are on the weight basis.

Production Example 1

Sodium Glyoxylate

To 456 g (3.10 mol) of an aqueous 50% glyoxylic acid solution, 645 g (3.22 mol) of an aqueous 20% sodium hydroxide solution was added. The produced white crystal was collected by filtration, washed with water and then dried at 50° C. for 1 hour to obtain 210 g (1.84 mol, yield: 59.5%) of sodium glyoxylate. The solubility of the obtained sodium glyoxylate in water at 23° C. was 17.1%.

Production Example 2

Calcium Diglyoxylates

To 101 g (0.68 mol) of an aqueous 50% glyoxylic acid solution, 101 g of water was added to form a 25% aqueous solution, and 268 g (0.34 mol) of an aqueous 20% calcium acetate solution was added dropwise thereto over 2 hours. The produced white crystal was collected by filtration, washed with water and then dried at 50° C. for 1 hour to obtain 70.3 g (0.32 mol, yield: 93.6%) of calcium diglyoxylates. The solubility of the obtained calcium diglyoxylates in water at 23° C. was 0.7%.

Example 1

0.3 Parts by weight (5% by weight based on the AA-PVA-based resin) of the sodium glyoxylate obtained in Production Example 1 was added as a crosslinking agent to 60 parts by weight of a 10% aqueous solution of AA-PVA-based resin having a degree of saponification of 97.9 mol % and an average degree of polymerization of 2,300 and containing 4.8 mol % of acetoacetic ester group, and 24 parts of an inorganic fine particle ("Finesil X-45" produced by Tokuyama Corporation, amorphous synthetic silica, shape: sphere, average particle diameter: 4.5 μm) was gradually added while dispersing the particles. Thereto, 22.7 parts of polydiallyldimethylammonium chloride ("PAS-H-5L, 27% Aqueous Solution" produced by Nitto Boseki Co., Ltd.) as an ink fixing agent and 134 parts of water were added, and the mixture was stirred in a homogenizer ("T. K. ROBOMICS", manufactured by Tokushu Kika Kogyo Co., Ltd.) at 5,000 rpm for 10 minutes to prepare a coating solution for forming an ink receiving layer having a solid content of 15%.

This coating solution was applied on a high-quality paper having a basis weight of 64 $g/m^2$ by an applicator with a clearance of 75 μm and then dried at 105° C. for 10 minutes in a hot-air drier to form an ink receiving layer, whereby an ink jet recording medium was obtained.

(Coloration Resistance)

After the obtained ink jet recording medium was stored under the conditions of 60° C. and 90% RH for 3 days and for 7 days, the degree of coloration of the ink jet recording medium was measured using a colorimeter ("SZ-Σ90", manufactured by Nippon Denshoku Industries Co., Ltd.) by a reflection method to determine the yellow index (YI) value. The results are shown in Table 1.

(Water Resistance)

The obtained ink jet recording medium was subjected to printing by an ink jet printer ("PX-201", manufactured by Seiko Epson Corp.) and then dipped in hot water at 80° C. for 2 hours, and the condition of the printed part was observed with an eye and evaluated as follows. The results are shown in Table 1.

A: Separation of the printed surface or deterioration of the base are not observed.

B: Separation of the printed surface is slightly observed but the printed character can be read.

C: The printed surface is separated from the base.

FIG. 1 shows the printed matter after the ink jet recording medium obtained was evaluated for water resistance.

Example 2

Figure 2:
FIG. 2 shows the printed matter after the ink jet recording medium obtained in Example 2 is evaluated for water resistance.

An ink jet recording medium was produced in the same manner as in Example 1 except that 0.3 parts by weight (5% by weight based on the AA-PVA-based resin) of the crosslinking agent (calcium diglyoxylates) obtained in Production Example 2 was added as the crosslinking agent in Example 1, and evaluated in the same manner. The results are shown in Table 1. FIG. 2 shows the printed matter after the ink jet recording medium obtained was evaluated for water resistance.

Comparative Example 1

Figure 3:
FIG. 3(*a*) shows the printed matter after the ink jet recording medium obtained in Example 1 is evaluated for water resistance, and FIG. 3(*b*) shows the printed matter after the ink jet recording medium obtained in Comparative Example 1 is evaluated for water resistance.
Figure 3:

An ink jet recording medium was produced in the same manner as in Example 1 except that dihydrazide adipate was used as the crosslinking agent and 0.3 parts by weight (5% by weight based on the AA-PVA-based resin) of the crosslinking agent and 0.8 parts by weight (molar ratio: dihydrazide adipate/hydrochloric acid=0.21) of 35% hydrochloric acid were added in Example 1, and evaluated in the same manner. The results are shown in Table 1. FIG. 3(*b*) shows the printed matter after the ink jet recording medium obtained was evaluated for water resistance (FIG. 3(*a*) is a view showing the printed matter after the ink jet recording medium obtained in Example 1 was evaluated for water resistance).

TABLE 1

| | | Coloration Resistance (YI Value) | | | |
|---|---|---|---|---|---|
| | Crosslinking Agent | After 0 day | After 3 days | After 7 days | Water Resistance |
| Example 1 | Na glyoxylate | 0.03 | 1.32 | 3.99 | A |
| Example 2 | Ca glyoxylate | 0.02 | 1.33 | 4.09 | A |
| Comparative Example 1 | dihydrazide adipate | 0.32 | 13.3 | 14.8 | C |

As apparent from these results, in the ink jet recording medium obtained using a glyoxylate as the crosslinking agent for the AA-PVA-based resin, coloration immediately after production or after storage under the high-humidity condition was little and the water resistance was excellent, compared with the ink jet recording medium obtained using hydrazide adipate.

Example 3

0.13 Parts by weight (5% by weight based on the AA-PVA-based resin) of the calcium diglyoxylates obtained in Production Example 1 as the crosslinking agent was added to 50 parts by weight of a 5% aqueous solution of the same AA-PVA-based resin as used in Example 1, sodium hydroxide was added until the pH became 7 (20° C.), and these were mixed with stirring to obtain a coating solution for forming an ink receiving layer.

This coating solution was adjusted to 20, 40, 60 and 80° C. and after putting a cylindrical stirring bar (length: 15 mm, cross-sectional diameter: 6.5 mm), stirred with a magnetic stirrer at 1,350 rpm, and the time until the stirring bar was not rotated was measured. The results are shown in Table 2.

Example 4

A coating solution for forming an ink receiving layer was produced in the same manner as in Example 3 except that the pH adjustment with sodium hydroxide was not performed in Example 3, and evaluated at 80° C. by the same method. The results are shown in Table 2.

Comparative Example 2

A coating solution for forming an ink receiving layer was produced in the same manner as in Example 3 except that 0.13 parts by weight (5% by weight based on the AA-PVA-based resin) of dihydrazide adipate was added as the crosslinking agent and the pH adjustment was not performed in Example 3, and evaluated at 20° C. an 80° C. by the same method. The results are shown in Table 2.

TABLE 2

| | | Example 3 | Example 4 | Comparative Example 2 |
|---|---|---|---|---|
| Crosslinking Agent | | Ca glyoxylate | Ca glyoxylate | dihydrazide adipate |
| pH | | 7.0 | 5.0 | 4.8 |
| Gelling time | 20° C. | 4 hours | 3 days or more | 2 min. and 55 sec. |
| | 40° C. | 32 min. and 45 sec. | — | — |
| | 60° C. | 4 min. and 30 sec. | — | — |
| | 80° C. | 1 min. and 21 sec. | 24 min. and 23 sec. | 1 min. and 30 sec. |

As apparent from these results, in the coating solution for forming an ink receiving layer obtained using a glyoxylate as the crosslinking agent for the AA-PVA-based resin, the difference between the gelation rate near ambient temperature and the gelation rate at high temperature is large and the coating solution is excellent in the storage stability and at the same time, suitable for the method for producing an ink jet recording medium, where the coating solution is once gelled and then dried.

The gelation rate can be also controlled by the pH of the coating solution.

On the other hand, in the coating solution obtained using dihydrazide adipate as the crosslinking agent, the difference in the gelation rate between ambient temperature and high temperature is small and not only the storage stability is insufficient but also the tolerance range of the production conditions is small.

While the present invention has been described in detail and with reference to specific embodiments thereof, it will be apparent to one skilled in the art that various changes and modifications can be made therein without departing from the spirit and scope of the present invention.

This application is based on Japanese Patent Application (Patent Application No. 2008-327598) filed on Dec. 24, 2008, the contents of which are incorporated herein by way of reference.

INDUSTRIAL APPLICABILITY

The ink jet recording medium of the present invention is assured of little coloration with time during storage and excellent water resistance and therefore, is suitable as a high-quality printing medium.

Also, the coating solution for forming an ink receiving layer of the present invention is stable at a low temperatures near ambient temperature and therefore, has a long pot life, and due to a large ratio of change in the gelation rate with respect to the temperature, the coating solution is very suitable for the method for producing an ink jet recoding medium, where the coating solution for forming an ink receiving layer is coated on a supporting base, gelled and then dried by heating, and can enhance the productivity in such a production method.

The invention claimed is:

1. An ink jet recording medium comprising a supporting base and an ink receiving layer containing an acetoacetic ester group-containing polyvinyl alcohol resin crosslinked by a glyoxylate.

2. A coating solution for forming an ink receiving layer of an ink jet recording medium, containing an acetoacetic ester group-containing polyvinyl alcohol resin, a glyoxylate and water.

3. The coating solution for forming an ink receiving layer according to claim 2, wherein the glyoxylate is an alkali metal salt of glyoxylic acid, or an alkaline earth metal salt of glyoxylic acid.

4. The coating solution for forming an ink receiving layer according to claim 3, wherein the glyoxylate is sodium glyoxylate or calcium diglyoxylate.

5. The coating solution for forming an ink receiving layer according to claim 2, wherein the content of the acetoacetic ester group in the acetoacetic ester group-containing polyvinyl alcohol resin is from 0.1 to 20 mol %.

6. The coating solution for forming an ink receiving layer according to claim 2, wherein the content of the glyoxylate is from 0.1 to 200 parts by weight per 100 parts by weight of the acetoacetic ester group-containing polyvinyl alcohol resin.

7. The coating solution for forming an ink receiving layer according to claim 2, which further contains an inorganic fine particle.

8. The coating solution for forming an ink receiving layer according to claim 2, wherein the pH is from 3 to 10.

9. The coating solution for forming an ink receiving layer according to claim 2, wherein the solid content concentration is from 1 to 50% by weight.

10. A method for producing an ink jet recording medium, comprising, in this order, a step of applying the coating solution for forming an ink receiving layer according to claim 2 on a supporting base, a step of heat-treating the coating to cause gelling, and a step of drying the gelled coating to form an ink receiving layer.

* * * * *